United States Patent

Etherington et al.

[11] Patent Number: 5,261,617
[45] Date of Patent: Nov. 16, 1993

[54] CABLE REELER

[75] Inventors: Michael Etherington, Abingdon, Va.; Michael R. Long, Gainsborough, England

[73] Assignee: Dosco Overseas Engineering Ltd., Notts, England

[21] Appl. No.: 906,578

[22] Filed: Jun. 30, 1992

[51] Int. Cl.⁵ .............................................. B65H 75/38
[52] U.S. Cl. ................................................. 242/54 R
[58] Field of Search ............ 242/54 R, 86.5 R, 86.51, 242/117; 254/265, 264, 374; 191/12.2 A, 12.2 R, 12.4

[56] References Cited

U.S. PATENT DOCUMENTS

| 2,231,384 | 2/1941 | Goldberg | 242/55 |
| 2,589,235 | 3/1952 | Dudley | |
| 2,654,548 | 10/1953 | Hopkins | |
| 2,913,964 | 11/1959 | Mann | |
| 3,172,510 | 3/1965 | Lee et al. | 191/12.2 |
| 3,275,300 | 9/1966 | Delacour et al. | 254/265 |
| 3,776,519 | 12/1973 | Hamilton | 242/54 R |
| 3,841,407 | 10/1974 | Bozeman | 254/265 X |
| 3,861,505 | 1/1975 | Sugimura | 191/12.2 R |
| 3,885,754 | 5/1975 | Delerue | 242/54 R X |
| 4,090,627 | 5/1978 | Teti | |
| 4,090,675 | 5/1978 | Betta | 242/117 |
| 4,700,023 | 10/1987 | Hillmann et al. | 191/12.2 A |

Primary Examiner—John M. Jillions
Attorney, Agent, or Firm—Webb, Burden, Ziesenheim & Webb

[57] ABSTRACT

A cable reeler having two pairs of sprockets rotatable about spaced parallel axes. Endless roller chains entrained around the sprockets and a motor driving one of the sprockets to rotate the other sprockets to move the endless roller chains. Cable support members carried by the roller chains having elongated arms to retain the cable on the reeler.

20 Claims, 2 Drawing Sheets

CABLE REELER

BACKGROUND OF THE INVENTION

1. Field of the Invention

This invention relates generally to a cable reeler and more particularly to a cable reeler for continuously maintaining a length of cable in a taut condition.

Cable reeling drums are used extensively to carry cable for transmitting electrical, pneumatic or hydraulic power to mobile equipment from a fixed power source. The drums are also used for reeling hose, rope and other elongated flexible materials (hereinafter referred to generally as cable) when it is important that trailing lengths of the cable are not left lying loosely about where they can be damaged, tangled, or obstruct workmen and equipment. A rotatable drum is used to pay out or wind in cable as required, depending upon the operating position of the equipment relative to the source to which the end of the cable is connected.

2. Description of the Prior Art

Known cable reeling drums include a central coupling so that a commodity can be transferred from a cable connected to a stationary source to the cable on the rotatable drum. In the case of an electric cable, for example, there may be several individual cores and the coupling is in the form of a slip ring. This permits the transfer of electric current or a signal from each core in the fixed cable to the complementary core in the cable on the drum. In the case of a hydraulic hose, a fluid tight rotary seal at the end will ensure that fluid is transferred without leakage. Known cable reeling drums are rotated by a motor, and if the drum has a substantial width, the cable must be evenly distributed back and forth across the width of the drum as it is wound thereon or removed therefrom. This is normally achieved with a cable distribution arm having a guide through which the cable passes, and which is moved automatically across the width of the drum as the drum rotates. The arm is normally mounted on a rotatable spindle which is mounted to extend across the width of the drum parallel to the axis of rotation of the drum and is spaced from the drum by a distance slightly more than the maximum drum radius. The distribution arm is moved across the width of the drum by a pair of opposed helices formed in the surface of the rotatable spindle, which are engaged by a complimentary sleeve-like follower on the arm. A drive such as a sprocket and a chain is provided to rotate the spindle with the drum, and when the distribution arm reaches one end of the spindle, it automatically engages the opposed helix, and starts to move back across the width of cable of the drum. This arrangement ensures that the cable is carefully laid onto the drum, on top of any cable which is already wound thereon. This distribution arrangement is well-known to those skilled in the art and is similar to a pump action screwdriver (but in reverse).

While known cable reeling drums are satisfactory, their capacity is limited by their width and diameter. For example, in underground mines, there is often a rigid constraint on the height of the equipment, and yet it may be necessary to operate a mining machine a considerable distance from a power source. This requires a very high capacity cable reeler. Due to the height constraint and other space constraints on the size of the mining machine, it may be impossible to use a known cable reeling drum.

SUMMARY OF THE INVENTION

A high capacity cable reeler has been developed which can be used in place of a large diameter drum.

The cable reeler of the present invention comprises a pair of laterally spaced rotary devices which are rotatable about substantially parallel spaced axes Endless entrainment means are supported on the rotary devices and a motor drives one of the rotary devices to move the endless entrainment means. A plurality of cable support members are carried by the endless entrainment means and a cable distribution means evenly distributes the cable across the width of the cable support devices. A coupling device connects the cable on the support devices to a stationary cable leading to a commodity source and means connect the endless entrainment means to the coupling device so that the latter rotates once for each circuit of the endless entrainment means.

Preferably, the rotary devices are two pairs of laterally spaced sprockets with respective pairs being rotatable about spaced substantially parallel axes. The endless entrainment means may be a roller chain entrained about the sprockets in each pair of sprockets.

The cable support members are U-shaped stirrups extending between and carried by the roller chains. A bracket is secured to the pins of alternate links of each roller chain, and respective stirrups extend between and are connected to opposed pairs of brackets.

The coupling device is preferably a slip ring assembly. The coupling device is connected to a sprocket for the endless entrainment means by a chain drive, although directly meshing spur gears or a belt drive may be used.

Preferably, the sprockets are driven by a hydraulic motor which is connected directly to one of the sprockets.

One use for the above described cable reeler is on a mine shuttlecar, such as that disclosed in our co-pending U.S. patent application Ser. No. 07/906,569 filed contemporaneously herewith although it will be appreciated by those skilled in the art that such a cable reeler has numerous uses.

A complete understanding of the invention will be obtained from the following description when taken in connection with the accompanying drawings wherein like reference characters identify like parts throughout.

DESCRIPTION OF THE PREFERRED EMBODIMENT

Figure 1:
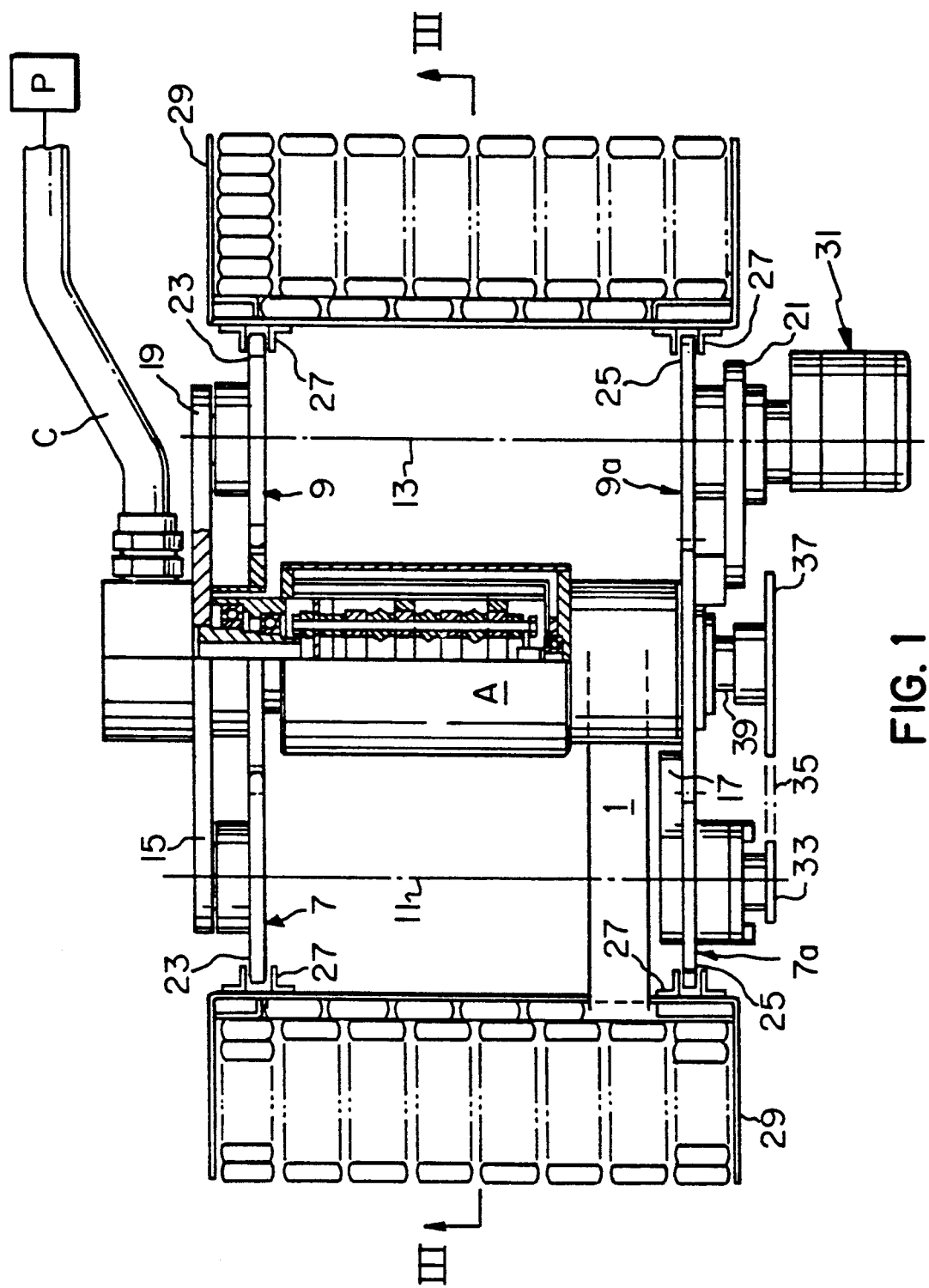
FIG. 1 is a plan view, partly in section, of a cable reeler according to the invention.
Figure 2:
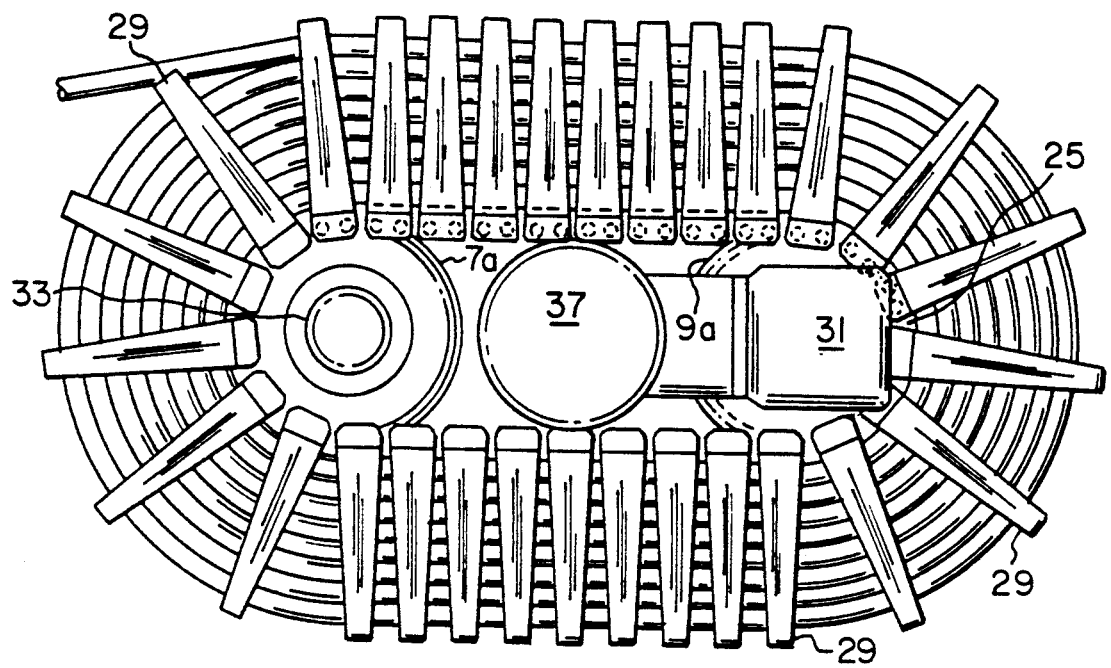
FIG. 2 is a side elevation of the cable reeler shown in FIG. 1.
Figure 3:
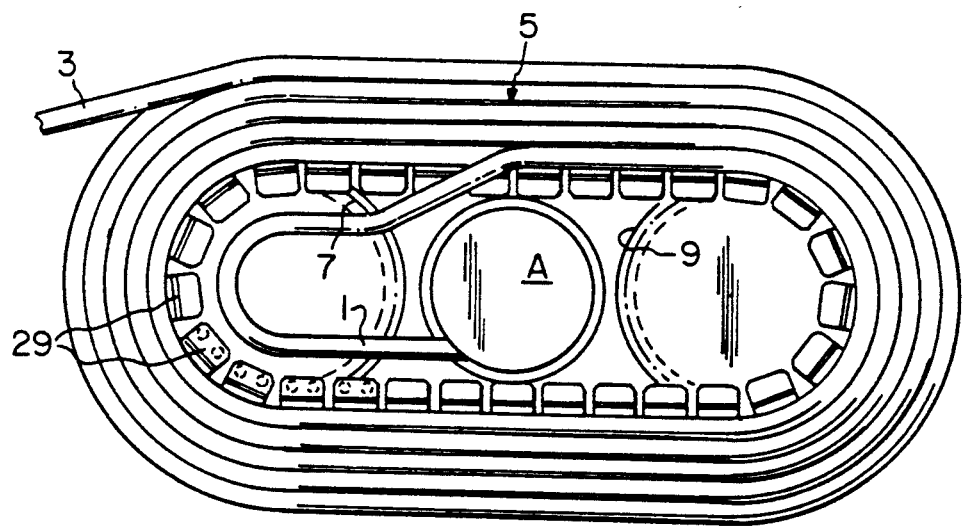
FIG. 3 is a section on line III—III of FIG. 1.

The cable reeler shown in the drawings is for electrical cable, and as can be seen in FIG. 1 of the drawings, the output end of cable C is connected to a control panel P on a vehicle (not shown) on which the cable reeler is mounted. Cable C leads to a slip ring assembly A on the reeler. Slip ring assembly A is of known construction, and forms no part of the invention. As can be seen in FIG. 3 of the drawings, the cable which is to be reeled onto, or unreeled from, the reeler, has an end 1 connected to slip ring assembly A. The opposite end 3 of the cable leads to a source of electricity and the remainder 5 of the cable is stored on the reeler.

The reeler has two pairs of laterally spaced sprockets 7, 7a and 9, 9a, which rotate about substantially parallel spaced axes 11 and 13. Each sprocket is supported on a stub shaft rotatable in suitable bearings supported in a bracket 15, 17, 19 and 21 which are a part of the reeler frame. Two continuous roller chains 23 and 25 are entrained, respectively, around sprockets 7 and 9 and 7a and 9a. The continuous roller chains are of standard construction and alternate links of each chain have a bracket 27 connected thereto. A generally U-shaped cable supporting stirrup 29 is connected between each pair of opposed brackets 27.

A hydraulic motor 31 is supported on a mounting bracket 21 on the reeler frame and its output shaft is coupled directly to sprocket 9a to drive that sprocket and continuous roller chains 23 and 25 around their sprockets. A further sprocket 33 is directly coupled to sprocket 7a to rotate therewith and sprocket 33 is connected by a continuous roller chain 35 to another sprocket 37 which is fixedly mounted on a drive shaft 39 of slip ring assembly A. Hence, as motor 31 rotates sprocket 9a, chain 25 rotates sprocket 7a and the chain advances around sprockets 7a and 9a. Because stirrups 29 are connected to continuous roller chains 25 and 23, sprockets 7 and 9 will also rotate, and chain 23 will advance around sprockets 7 and 9.

The gearing of sprockets 33 and 37 connected by continuous roller chain 35 is selected so that during a complete circuit of the stirrups around the sprockets, the rotatable part of slip ring assembly A rotates once. Hence, as cable 5 is wound on or off the cable reeler, the length of cable leading between assembly A and the endless entrainment means (FIG. 3 illustrates how the cable is led onto one of the stirrups 29) will move around with the stirrups and the rotatable part of the slip ring assembly.

It will be appreciated that the width and depth of stirrups 29 determine the capacity of the cable reeler. The illustrated construction is ovaloid, but it will be understood that it could have different shapes and dimensions, depending upon the space constraints where the cable reeler is to be used. All that matters is that the endless entrainment means are provided for supporting the cable, and that the rotatable part of the slip ring assembly rotates only once during each complete circuit of the endless entrainment means.

In order to lay the cable correctly across the width of the cable reeler, a cable distribution device (not shown) is provided. This is of known construction, and should be such that for a complete circuit of the endless entrainment means, it will move transversely of the reeler to guide the next loop of cable alongside the loop previously wound onto the reeler. Furthermore, once the final loop of one layer of cable has been wound at an edge of the reeler, the transverse movement of the cable distribution device is reversed so that it subsequently guides a new layer of cable over the top of the previous wound layer of cable. This can be achieved by supporting a guide arm for the cable on a bridging spindle and providing thread means, e.g., two opposed helices, on the spindle and thread engaging means on the guide arm which causes the arm to move back and forth across the cable reeler as the spindle is rotated. The rotation of the spindle is controlled by movement of the endless entrainment means. It is within the knowledge of one skilled in the art to construct this part of the reeler, and per se, it forms no part of the present invention.

While a specific embodiment of the invention has been described in detail herein, it will be appreciated by those skilled in the art that various modifications and alternatives to this embodiment could be developed in light of the overall teachings of the disclosure. Accordingly, the particular arrangements are illustrative only and are not limiting as to the scope of the invention which is to be given the full breadth of the appended claims and any and all equivalents thereof.

We claim:

1. A cable reeler comprising a first pair of spaced rotary devices rotatable about an axis, a second pair of spaced devices rotatable about an axis substantially parallel to and spaced from said first axis, endless entrainment means entrained around said rotary devices, means for driving one of said rotary devices to move said endless entrainment means, a plurality of cable support devices carried by said endless entrainment means, a coupling device adapted to connect the cable on said support devices to a stationary cable leading to a commodity source, and means for connecting said endless entrainment means to said coupling device so that said coupling device rotates once for each circuit of rotation of said endless entrainment means.

2. A cable reeler as set forth in claim 1 wherein each of said first and second pairs of spaced rotary devices is a first pair of laterally spaced sprockets and a second pair of laterally spaced sprockets, said sprockets of each of said first and second pairs being rotatable about one of said substantially parallel spaced axes, and said endless entrainment means is two spaced continuous roller chains, each of said continuous roller chains being entrained about one sprocket of each of said first and second pairs of sprockets.

3. A cable reeler as set forth in claim 2 wherein each of said cable support devices is a U-shaped stirrup extending between and attached to said two spaced continuous roller chains.

4. A cable reeler as set forth in claim 3 wherein alternate links of each of said two spaced continuous roller chains have pins extending therefrom and brackets attached to said two spaced continuous roller chains by said pins, and said U-shaped stirrups are attached to opposed pairs of said brackets.

5. A cable reeler as set forth in claim 1 wherein said coupling device is a slip ring assembly.

6. A cable reeler as set forth in claim 1 wherein said means for connecting said endless entrainment means to said coupling device is a sprocket and chain drive.

7. A cable reeler as set forth in claim 1 wherein said means for driving one of said rotary devices is a hydraulic motor.

8. A cable reeler as set forth in claim 2 wherein said coupling device is a slip ring assembly.

9. A cable reeler as set forth in claim 2 wherein said means for connecting said endless entrainment means to said coupling device is a sprocket and chain drive.

10. A cable reeler according to claim 2 wherein said means for driving one of said rotary devices is a hydraulic motor connected directly to one of said sprockets.

11. A cable reeler as set forth in claim 3 wherein said coupling device is a slip ring assembly.

12. A cable reeler as set forth in claim 3 wherein said means for connecting said endless entrainment means to said coupling device is a sprocket and chain drive.

13. A cable reeler as set forth in claim 3 wherein said means for driving one of said rotary devices is a hydraulic motor connected directly to one of said sprockets.

14. A cable reeler as set forth in claim 4 wherein said coupling device is a slip ring assembly.

15. A cable reeler as set forth in claim 4 wherein said means for connecting said endless entrainment means to said coupling device is a sprocket and chain drive.

16. A cable reeler as set forth in claim 4 wherein said means for driving one of said rotary devices is a hydraulic motor connected directly to one of said sprockets.

17. A cable reeler as set forth in claim 5 wherein said means for driving one of said rotary devices is a hydraulic motor connected directly to one of said sprockets.

18. A cable reeler as set forth in claim 6 wherein said means for driving one of said rotary devices is a hydraulic motor connected directly to one of said sprockets.

19. A cable reeler comprising a first pair of spaced rotary devices rotatable about an axis, a second pair of spaced devices rotatable about an axis substantially parallel to and spaced from said first axis, endless entrainment means entrained around said rotary devices, means for driving one of said rotary devices to move said endless entrainment means and a plurality of cable support devices carried by said endless entrainment means.

20. A cable reeler as set forth in claim 19 wherein each of said first and second pairs of spaced rotary devices is a pair of laterally spaced sprockets, and said endless entrainment means is two spaced continuous roller chains, each of said continuous roller chains being entrained about one sprocket of each of said pairs of sprockets.

* * * * *

UNITED STATES PATENT AND TRADEMARK OFFICE
CERTIFICATE OF CORRECTION

PATENT NO. : 5,261,617
DATED : November 16, 1993
INVENTOR(S) : Michael Etherington and Michael R. Long It is certified that error appears in the above-indentified patent and that said Letters Patent is hereby corrected as shown below:

Title page, after "[22] Filed: Jun. 30, 1992", insert
--[30] Foreign Application Priority Data
Jan. 14, 1992 [UK] United Kingdom ... 9200679.0--.

Signed and Sealed this

Fourteenth Day of June, 1994

*Attest:*

BRUCE LEHMAN

*Attesting Officer*  *Commissioner of Patents and Trademarks*